(12) United States Patent
Cho et al.

(10) Patent No.: US 10,634,940 B2
(45) Date of Patent: Apr. 28, 2020

(54) METHOD FOR PRODUCING CURVED DISPLAY

(71) Applicant: EFFINET SYSTEMS, INC., Seoul (KR)

(72) Inventors: Min-Soo Cho, Seoul (KR); Kwon-Hag Kang, Suwon-si (KR)

(73) Assignee: EFFINET SYSTEMS, INC., Seoul (KR)

( * ) Notice: Subject to any disclaimer, the term of this patent is extended or adjusted under 35 U.S.C. 154(b) by 0 days.

(21) Appl. No.: 16/382,202

(22) Filed: Apr. 12, 2019

(65) Prior Publication Data

US 2019/0235303 A1    Aug. 1, 2019

Related U.S. Application Data

(63) Continuation of application No. 15/739,775, filed as application No. PCT/KR2016/007094 on Jul. 1, 2016, now Pat. No. 10,353,229.

(30) Foreign Application Priority Data

Jul. 24, 2015 (KR) .................. 10-2015-0104735

(51) Int. Cl.
  *G02F 1/1333* (2006.01)
  *G02F 1/1339* (2006.01)
  *G02F 1/1343* (2006.01)

(52) U.S. Cl.
  CPC ...... *G02F 1/133305* (2013.01); *G02F 1/1333* (2013.01); *G02F 1/1339* (2013.01);
  (Continued)

(58) Field of Classification Search
  CPC .............................................. G02F 1/133305
  See application file for complete search history.

(56) References Cited

U.S. PATENT DOCUMENTS

2014/0226112 A1*  8/2014  Kim ...................... G02F 1/1333
                                                                349/96
2015/0000823 A1    1/2015  Kim et al.
(Continued)

FOREIGN PATENT DOCUMENTS

KR    10-2010-0025219 A    3/2010
KR    10-2012-0013265 A    2/2012
(Continued)

OTHER PUBLICATIONS

International Search Report in International Application No. PCT/KR2016/007094, dated Sep. 28, 2016.

*Primary Examiner* — Edmond C Lau
(74) *Attorney, Agent, or Firm* — Park, Kim & Suh, LLC (57) ABSTRACT

The present invention relates to a method for producing a curved display, which produces a curved display using a flat display module. A method for producing a curved display, according to one embodiment of the present invention, is to produce a curved display using a flat display module, the method comprising the steps of: masking the display module with a masking element so as to cover parts of the upper plate and the lower plate thereof, in which a masking area of the upper plate and a masking area of the lower plate are disposed asymmetrically up and down; etching the display module to a preset thickness so as to reduce the thickness of the display module except for the masking areas in the masked display module; removing the masking element from the display module after the etching step; and curving the display module.

6 Claims, 9 Drawing Sheets

(52) U.S. Cl.
CPC ...... *G02F 1/1343* (2013.01); *G02F 1/133308* (2013.01); *G02F 2001/133311* (2013.01); *G02F 2001/133325* (2013.01); *G02F 2001/133331* (2013.01); *G02F 2201/121* (2013.01); *G02F 2201/123* (2013.01)

(56) References Cited

U.S. PATENT DOCUMENTS

| | | | |
|---|---|---|---|
| 2015/0103298 A1* | 4/2015 | Lee | G02F 1/133351 349/123 |
| 2017/0351135 A1 | 12/2017 | Kim et al. | |
| 2017/0352547 A1* | 12/2017 | Eom | G02F 1/1303 |

FOREIGN PATENT DOCUMENTS

| KR | 10-2013-0026285 A | 3/2013 |
|---|---|---|
| KR | 10-2013-0026286 A | 3/2013 |
| KR | 10-2014-0053774 A | 5/2014 |
| KR | 10-1478823 B1 | 1/2015 |
| KR | 10-1610692 B1 | 4/2016 |

\* cited by examiner

METHOD FOR PRODUCING CURVED DISPLAY

CROSS-REFERENCE TO RELATED APPLICATIONS

This application is a continuation of U.S. patent application Ser. No. 15/739,775, filed on Dec. 25, 2017, which is the National Phase Application of PCT International Application No. PCT/KR2016/007094, which was filed on Jul. 1, 2016, and which claims priority from Korean Patent Application No. 10-2015-0104735 filed with the Korean Intellectual Property Office on Jul. 24, 2015. The disclosures of the above patent applications are incorporated herein by reference in their entirety.

TECHNICAL FIELD

The present invention relates to a method for producing a curved display, more particularly to a method of manufacturing a curved display by using a planar display module.

BACKGROUND ART

Advances in display technology have allowed the development and use of various types of display devices. One such device is the liquid crystal display, which uses liquid crystal to present images.

The liquid crystal panel of a typical liquid crystal display (LCD) may include two substrates and a layer of liquid crystal having the property of dielectric anisotropy positioned between the substrates. A picture may be obtained by applying an electric field to the liquid crystal layer and adjusting the intensity of the electric field to adjust the transmittance of light that passes through the liquid crystal layer. The liquid crystal display is a representative example of an easily portable flat panel display (FPD), and the TFT-LCD type, which uses a thin-film transistor (TFT) as the switching component is widely being used.

Among the two substrates arranged facing each other in a liquid crystal panel, the lower substrate may have multiple display signal lines, i.e. gate lines and data lines, as well as multiple thin-film transistors and pixel electrodes, etc., formed thereon, while the upper of the two substrates may have a color filter and a common electrode formed thereon.

Such a liquid crystal panel is typically manufactured in a flat form, and therefore in cases where a display having a curved form is needed, the typical flat liquid crystal panel cannot be used. The related prior art can be found in Korean Patent Publication No. 10-2012-0013265.

There has also been developed a flexible liquid crystal panel, which employs substrates of a flexible material instead of the glass substrates of the liquid crystal panel to be capable of bending when an external force is applied.

However, the conventional flexible liquid crystal panel may entail a difficult manufacturing procedure as well as a high manufacturing cost.

Thus, there is need for research on a method of manufacturing a curved display panel that allows an easy manufacturing procedure and a low manufacturing cost.

DISCLOSURE

Technical Problem

An objective of the present invention is to provide a method of manufacturing a curved display with which a planar display module can be used to manufacture a curved display more effectively.

Another objective of the present invention is to provide a method of manufacturing a curved display that can reduce damage when manufacturing the curved display using a planar display module.

Another objective of the present invention is to provide a method of manufacturing a curved display with which a curved display can be manufactured using a planar display module without additional elements.

Technical Solution

To achieve the objectives above, an embodiment of the present invention discloses a method of manufacturing a curved display from a planar display module, where the method includes: masking the display module with a masking element such that portions of an upper substrate and a lower substrate of the display module are covered, with the masking area of the upper substrate and the masking area of the lower substrate positioned asymmetrically with respect to an up-down direction; etching the display module such that portions of the masked display module other than the masked portions are decreased in thickness to a predetermined thickness; removing the masking element from the display module after the etching; and bending the display module into a curved plane.

To achieve the objectives above, an embodiment of the present invention discloses a method of manufacturing a curved display from a planar display module, where the method includes: masking the display module with a masking element such that portions of an upper substrate and a lower substrate of the display module are covered; etching the display module such that portions of the masked display module other than the masked portions are decreased in thickness to a predetermined thickness; removing the masking element from the display module after the etching; bending the display module into a curved plane; and attaching the bent display module to a protective element having a particular radius of curvature by using a double-sided tape of a particular thickness, where a first adhesion surface of the double-sided tape is adhered to an etched surface of the bent display module, and a second adhesion surface of the double-sided tape is adhered to a surface of the protective element.

Advantageous Effects

A method of manufacturing a curved display according to an embodiment of the present invention can reduce damage to the etched display module while the curved display is being manufactured by using a planar display module.

Also, an embodiment of the present invention can reduce the manufacturing cost, as the curved display is manufactured with a single etching process.

Also, an embodiment of the present invention can reduce the manufacturing cost, since the curved display can be manufactured using a planar display module without additional elements.

DESCRIPTION OF REFERENCE NUMERALS

100: display module
110: first substrate
120: second substrate
130: liquid crystal layer
150: tap
151: circuit board
160: sealant
170: first masking element
171: second masking element
180: reinforcing material
300: cover
310, 320, 330, 340, 350: cover element
700, 800: protective element
710: screw hole
810: double-sided tape
820: sealant

MODE FOR INVENTION

A method of manufacturing a curved display associated with an embodiment of the present invention is described below with reference to the accompanying drawings.

A method of manufacturing a curved display according to an embodiment of the present invention can include a method of manufacturing a display having a particular curved form by using a planar display module.

Examples of the planar display module can include an LCD panel, an organic electroluminescent panel, etc. An LCD panel can have a liquid crystal layer between the substrates, while an organic electroluminescent panel can have an organic electroluminescent layer between the substrates.

Figure 1:
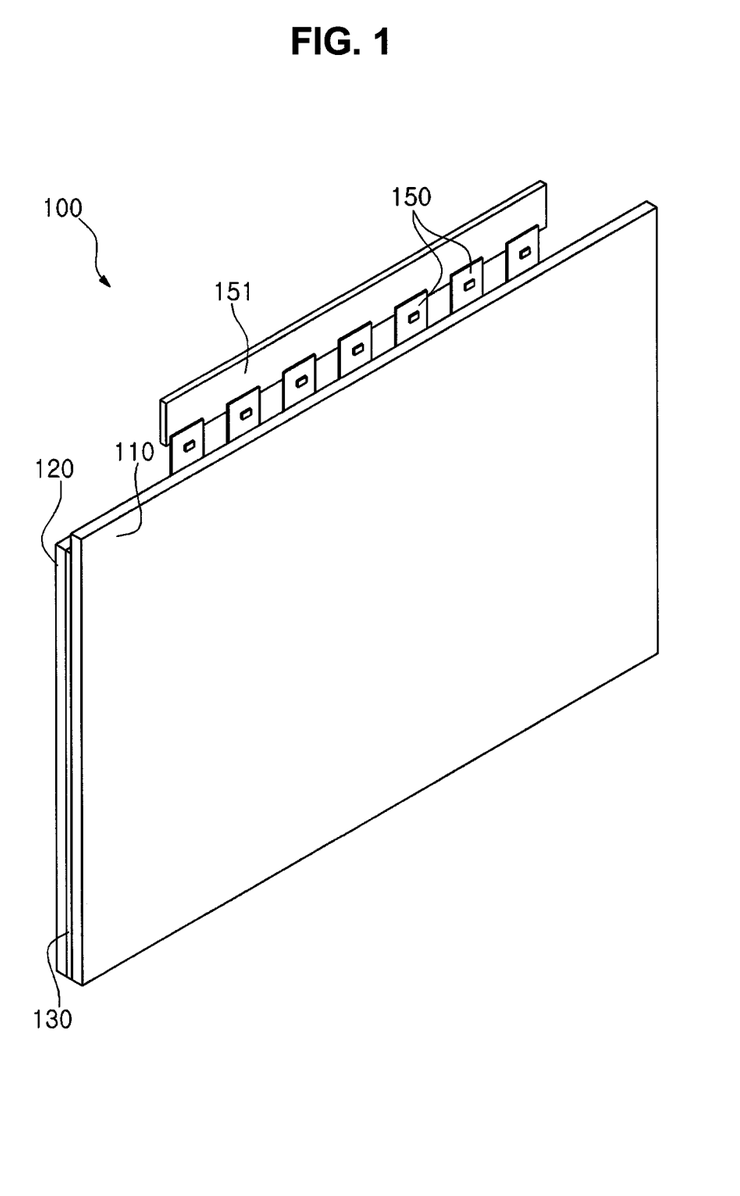
FIG. 1 is a perspective view of a display module associated with an embodiment of the present invention.

FIG. 1 is a perspective view of a display module associated with an embodiment of the present invention.

As illustrated in the figure, the display module 100 can be an LCD panel that includes a first substrate 110, a second substrate 120, and a liquid crystal layer 130 positioned between the first substrate 110 and second substrate 120, with taps 150 for electrical connections attached to the LCD panel.

Here, if one of the first substrate 110 and second substrate 120 is a thin-film transistor substrate, the other can be a color filter substrate, and the liquid crystal layer 130 can be composed of polymers arranged vertically or horizontally.

Also, the color filter substrate can include multiple filters having various functions laminated in an overlapping manner, and a hermetic seal (not shown) can be applied between the first substrate 110 and second substrate 120 to prevent the liquid crystal layer 130 from leaking out.

A tap 150 can be an electrode that is electrically connected to the one of the first substrate 110 and second substrate 120 serving as the thin-film transistor substrate, where the tap 150 can be configured in the form of a film to be capable of bending flexibly, and the tap 150 can have an IC mounted thereon.

Also, a tap 150 can include a circuit board 151 that is composed of various semiconductors and electrical components and is installed at a distal end of the electrode to control the thin-film transistor substrate.

Although the descriptions below use an example in which the display module 100 is an LCD, the display module 100 can also be a plasma type, OLED type, PLED type, etc.

The display module 100 can further include a polarizing film (not shown), which can be attached to the first substrate 110 or second substrate 120 or be included in the display module 100 in the form of a stacked layer.

Figure 2:
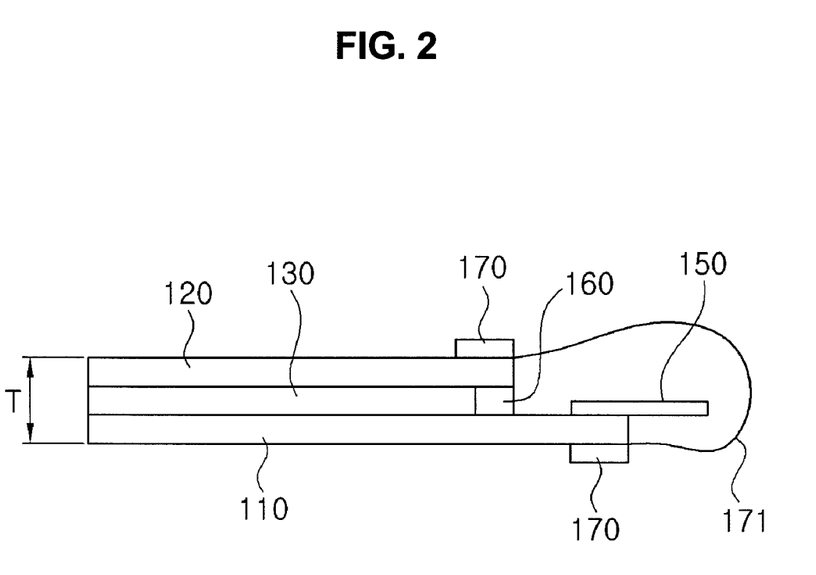
FIG. 2 is a cross-sectional side view of the display module after a masking operation is performed according to a method of manufacturing a display associated with an embodiment of the present invention.

FIG. 2 is a cross-sectional side view of the display module after a masking operation is performed according to a method of manufacturing a display associated with an embodiment of the present invention. In cases where a polarizing film is attached to the display module 100, an operation of removing the polarizing film (not shown) can be performed first. The polarizing film can be reattached after the etching process. This is because the polarizing film may hinder the etching.

According to an embodiment of the present invention, all sides (four sides) of the display module 100 can be masked, or some of the sides can be masked. For example, it is possible to selectively perform the masking only on the side where the taps 150 are attached and the two sides neighboring the side where the taps 150 are attached.

FIG. 2 is a cross-sectional view of the display module 100 showing the side neighboring the side where the taps 150 are attached.

As illustrated in the figure, the lower substrate positioned below the liquid crystal layer 130 in the display module 100 may be the first substrate 110, and the upper substrate positioned over the liquid crystal layer 130 may be the second substrate 120. The thickness of the display module 100 may be represented as T. The T is the thickness of the display module 100 before the etching process. The display module 100 can have the edge portions of the liquid crystal layer 130 sealed with a sealant 160 to prevent the liquid crystal layer 130 from leaking out.

Near the edges of the upper substrate 120 and the lower substrate 110 of the display module, first masking elements 170 can be adhered for masking. A first masking element 170 can be an acid-resistant masking tape that can be readily attached to the substrate.

The masking area of the upper substrate 120 and the masking area of the lower substrate 110 where the first masking elements 170 are attached can be positioned asymmetrically. The masking area of the upper substrate 120 represents the area of the upper substrate 120 where the first masking element 170 is attached, and the masking area of the lower substrate 110 represents the area of the lower substrate 110 where the first masking element 170 is attached. For example, the masking can be performed such that a vertical projection area, which would be formed if the masking area of the upper substrate 120 were by vertically projected onto the lower substrate 110, does not overlap the masking area of the lower substrate 110.

According to an embodiment of the present invention, a procedure of covering the taps 150 attached to the display module 100 with a second masking element 171 for protection can precede the attaching of the first masking elements 170. For a more convenient covering procedure and for reductions in cost, an amorphous plastic element can be used for the second masking element 171. For example, the amorphous plastic element can be a vinyl bag.

That is, if the first masking elements 170 are attached to the masking area of the upper substrate 120 and the area of the lower substrate 110 while the second masking element 171 is coveting a region from the masking area of the upper substrate 120 to the masking area of the lower substrate 130, then the second masking element 171 may be secured to the upper substrate 120 and lower substrate 110.

Also, the masking can include masking the areas of the upper substrate 120 and lower substrate 110 where circuit patterns are formed, in order to protect the patterns.

The circuit patterns can be arranged in the edge areas of the upper substrate 120 and lower substrate 110. This is to make the effective display area, where the video signals are actually displayed, as wide as possible.

In one example, the taps 150 can be attached over the lower substrate 110. In this case, the lower substrate 110 may be formed longer than the upper substrate 120 and the liquid crystal layer 130 along the sideward direction, and the upper substrate 120 and the liquid crystal layer 130 may not be stacked vertically above the taps 150. Also, the masking areas of the lower substrate 110 and upper substrate 120 where the first masking elements 170 are attached can include edge areas that include the respective end portions. The end portion can be the distal portion of the lower substrate 110 or upper substrate 120, and when illustrating the lower substrate 110 and the upper substrate 120 in a plan view, can include the edge.

A reason for masking the upper substrate and lower substrate asymmetrically as above is because asymmetrical masking leads to less damage during the bending of the display module (e.g. LCD) for forming a curved shape compared to symmetrical masking.

Figure 3:
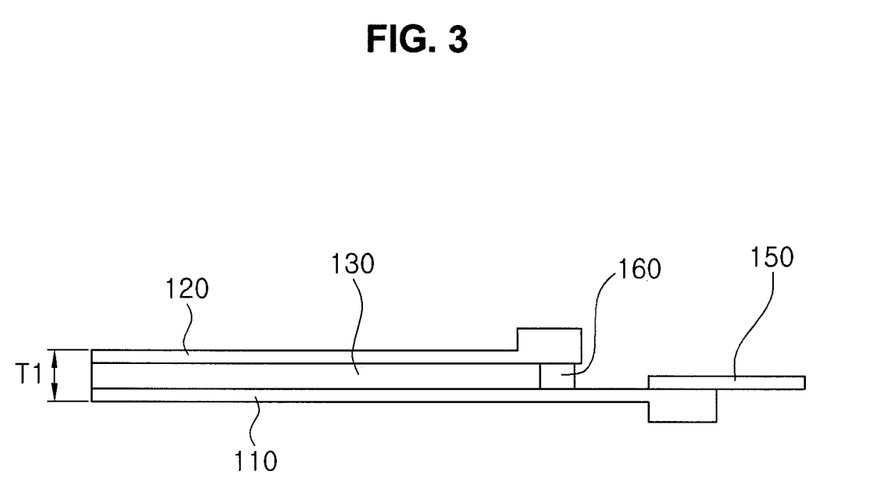
FIG. 3 is a cross-sectional side view of the display module after an etching step has been performed according to a method of manufacturing a display associated with an embodiment of the present invention.

FIG. 3 is a cross-sectional side view of the display module after an etching step has been performed according to a method of manufacturing a display associated with an embodiment of the present invention.

As illustrated in the figure, an etching step can be performed such that the thickness T of the display module 100 masked with the masking elements 170, 171 is reduced to a predetermined thickness T1. After performing the etching step, the unetched areas (areas that were not etched) of the upper substrate 120 and lower substrate 110 may be asymmetrical along the up-down direction. The above etching step can be performed by way of a chemical reaction triggered by an etching fluid.

Figure 4:
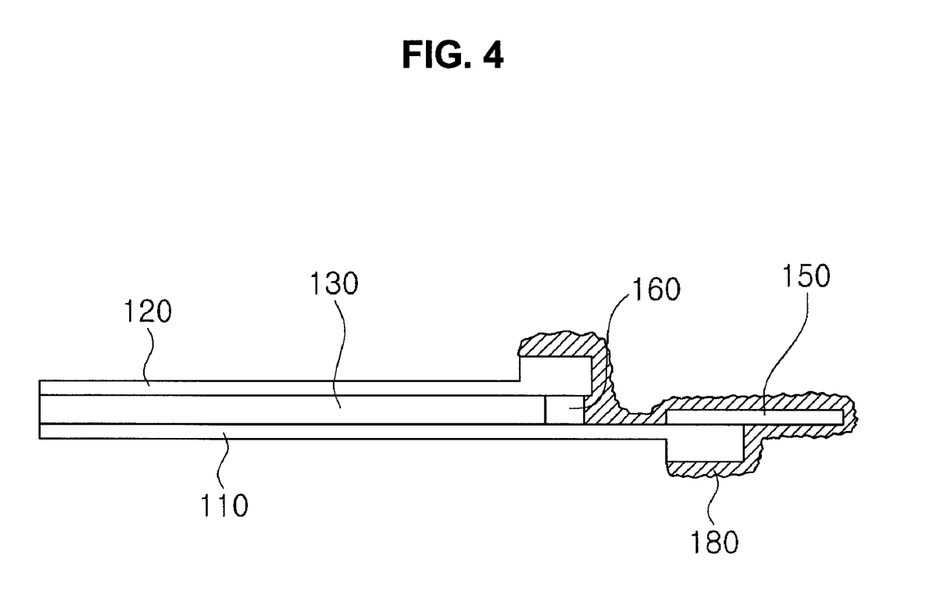
FIG. 4 is a cross-sectional side view of the display module with a reinforcing material attached, after the etching step has been performed, according to a method of manufacturing a display associated with an embodiment of the present invention.

FIG. 4 is a cross-sectional side view of the display module with a reinforcing material attached, after the etching step has been performed, according to a method of manufacturing a display associated with an embodiment of the present invention.

As illustrated in the figure, after the etching process, a reinforcing material 180 can be attached to cover the unetched areas, or the reinforcing material 180 can be attached to at least a partial area of the unetched areas. The reinforcing material 180 can include at least one of silicone and liquid adhesive. By attaching the reinforcing material as above, it is possible to reduce damage to the display module 100 during the operation of bending the etched display module 100 into a curved shape or during transport of the display module 100.

When the etching step has been completed, the masking elements 170, 171 can be removed from the display module 100.

Figure 5A:
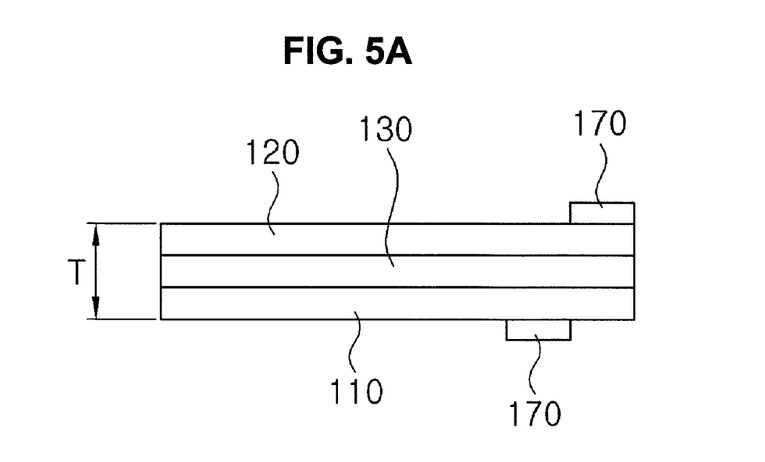
FIGS. 5(A) and 5(B) are cross-sectional side views of the display module after the masking and etching steps have been performed according to a method of manufacturing a display associated with an embodiment of the present invention.
Figure 5B:
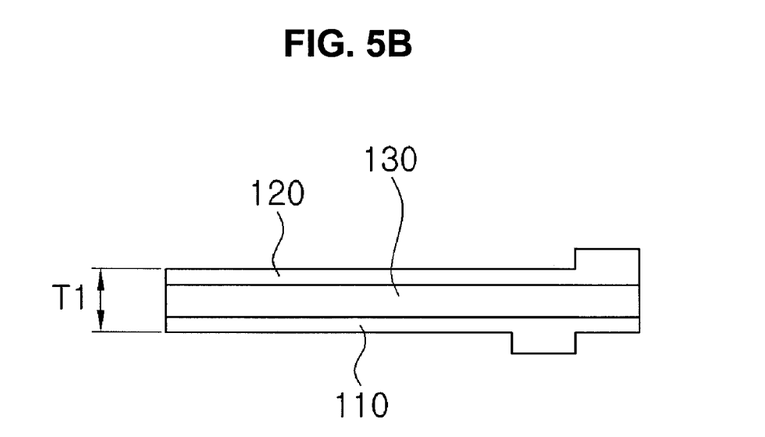

FIGS. 5(A) and 5(B) are cross-sectional side views of the display module after the masking and etching steps have been performed according to a method of manufacturing a display associated with an embodiment of the present invention. FIGS. 5(A) and 5(B) shows the arrangement after the masking and etching steps have been performed for a display module to which there are no taps attached.

FIG. 5(a) is a cross-sectional side view of the display module after the masking step has been performed.

As illustrated in the figure, the lower substrate positioned below the liquid crystal layer 130 in the display module 100 may be the first substrate 110, and the upper substrate positioned over the liquid crystal layer 130 may be the second substrate 120. The thickness of the display module 100 is represented as T. The T is the thickness of the display module 100 before the etching process.

In this embodiment, the masking step can be performed using only the first masking elements 170. The first masking elements 170 can be attached near the edges of the upper substrate 120 and lower substrate 110 of the display module for masking. A first masking element 170 can be an acid-resistant masking tape that can be readily attached to the substrate. The masking area of the upper substrate 120 and the masking area of the lower substrate 110 where the first masking elements 170 are attached can be positioned asymmetrically.

Also, the masking can include masking the areas of the upper substrate 120 and lower substrate 110 where circuit patterns are formed, in order to protect the patterns.

A reason for masking the upper substrate and lower substrate asymmetrically as above is because asymmetrical masking leads to less damage during the bending of the display module (e.g. LCD) for forming a curved shape compared to symmetrical masking.

FIG. 5(b) is a cross-sectional side view of the display module after the etching step has been performed.

As illustrated in the figure, an etching step can be performed such that the thickness T of the display module 100 masked with the masking elements 170 is reduced to a predetermined thickness T1. After performing the etching step, the unetched areas (areas that were not etched) of the upper substrate 120 and lower substrate 110 may be asymmetrical along the up-down direction.

When the etching step has been completed, the masking elements 170 can be removed from the display module 100.

When the operation of removing the masking elements of the display module 170 is completed as shown in FIGS. 2 to 4 or as shown in FIGS. 5(A) and 5(B), the display module 100 can be bent into an arbitrary curved plane to complete the curved display.

The curved plane can include not only a simple "C"-shaped curved plane having one point of inflexion but also an "S"-shaped curved plane having two points of inflexion as well as a wavering curved plane having many points of inflexion.

After removing the masking elements from a display module of the type shown in FIGS. 2 to 4 or from a display module of the type shown in FIGS. 5(A) and 5(B) is complete, an operation can be performed for securing the display module to a cover. The operation of securing the display module 100 to the cover can be performed simultaneously with the operation of bending the display module 100 or can be performed after the operation of bending the display module 100.

A general curved display may have the rear cover shaped as a curved plane. Therefore, in order to mount a board (e.g. signal processing board, power board, etc.) of which the side has a linear shape, a separate bracket having a planar shape may additionally be required.

However, with an embodiment of the present invention, the cover can be designed with a linear component, so that boards that have sides formed in a linear shape can be readily mounted onto the cover without a separate bracket.

Figure 6:
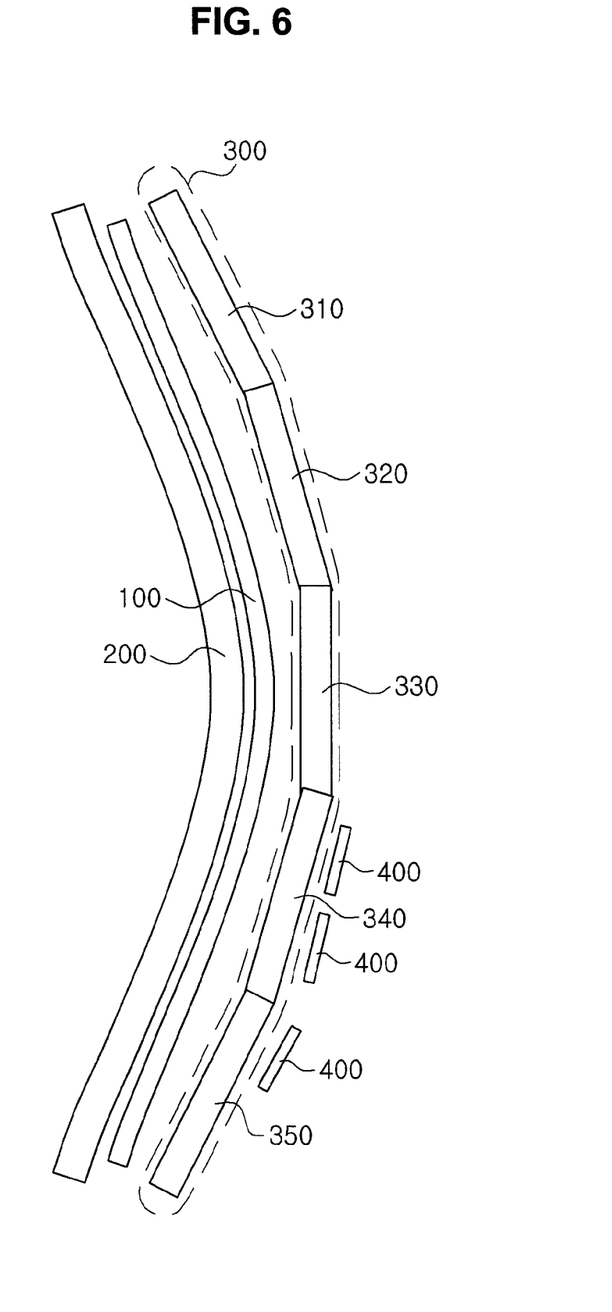
FIG. 6 illustrates the etched display module overlaid with a cover according to a method of manufacturing a display associated with an embodiment of the present invention.

FIG. 6 illustrates the etched display module overlaid with a cover according to a method of manufacturing a display associated with an embodiment of the present invention. FIG. 6 illustrates the display module 100 with the etched shapes omitted.

As illustrated in the figure, the cover 300 can be assembled by connecting five cover elements 310, 320, 330, 340, 350. Although the illustrated embodiment only shows five cover elements, the number of cover elements is not limited to five.

Each of the cover elements 310, 320, 330, 340, 350 may be shaped like a plate and may have its sides formed in a linear shape. Two neighboring cover elements (e.g. 310 and 320) may have their two sides forming a particular angle other than 180 degrees. By connecting two neighboring cover elements in this manner, the cover 300 can be designed such that the overall shape of the sides approximates a curve.

Reference numeral 200 represents an element placed at the front of the display module 100 and can include a front bezel, touch panel, glass, etc.

The various types of plate-shaped boards 400 having sides formed in linear shapes can be mounted on a flat area on any one of the multiple cover elements.

By thus designing the cover 300 to be assembled from a multiple number of plate-shaped cover elements of which the sides are shaped as lines, it is possible to mount plate-shaped boards 400 on the cover 300 without a separate linearly shaped bracket.

Although it is not shown in the drawings, one embodiment of the present invention can have the cover 300 composed of one cover element that has a plate-like shape and has sides formed in linear shapes. In this case, the one cover element can be folded into multiple areas. The angle formed between each neighboring area can be less than 180 degrees. By thus folding one cover element such that it is divided into multiple areas, the cover 300 can be designed such that the overall shape of the sides approximates a curve. Each of the multiple areas formed by folding the cover element can have a plate-like shape with the side forming a linear shape. Thus, various plate-shaped boards 400 can be mounted on a flat portion on any one of the multiple areas. By thus designing the cover 300 to be formed by a plate-shaped cover element having a linear side bent into multiple areas, it is possible to mount plate-shaped boards 400 on the cover 300 without a separate linearly shaped bracket.

According to an embodiment of the present invention, a protective element can be used for reducing the risk of damage to the unetched portions, which are the most vulnerable portions, during transport of the etched display module 100 or during a procedure of assembling other parts for actual operation.

Figure 7:
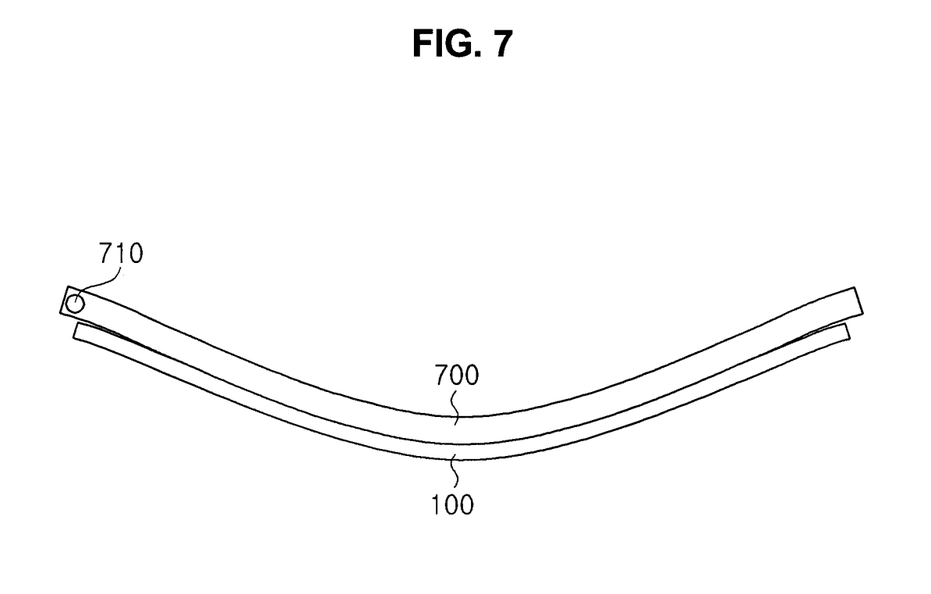
FIG. 7 illustrates the securing of the display module to a protective element according to a method of manufacturing a display associated with an embodiment of the present invention.

FIG. 7 illustrates the securing of the display module to a protective element according to a method of manufacturing a display associated with an embodiment of the present invention. FIG. 7 illustrates the display module 100 with the etched shapes omitted.

As illustrated in the figure, the display module 100 can be secured to a protective element 700 arranged at the upper surface or lower surface. The display module 100 can be secured to the protective element 700 by way of screws (not shown) fitted into screw holes 710. The protective element 700 can have relatively weaker (lower) brittleness compared to the etched display module 100.

The protective element 700 can include a metal frame and a frame of a transparent material having a particular radius of curvature.

In cases where a metal frame is used for the protective element 700, the metal frame can be fabricated to have a small thickness of about 0.1~1 T. Here, T is the thickness of the display module 100 before the etching.

As the metal frame is opaque, the metal frame can be fabricated such that the active region of the etched display module 100 is open. For example, the metal frame can be fabricated such that the area other than the boundary is opened, so that the effective display area of the display module 100 may be shown to the outside. The etched display module 100 may be attached to an upper surface or a lower surface of the metal frame using liquid adhesive or silicone, etc.

The etched display module 100 can be secured during the transport of the etched display module 100 or during a procedure of assembling other parts for actual operation, and since metal is used, damage to the most vulnerable portions, i.e. the unetched portions, can be prevented. In particular, since a force is applied equally to the unetched portions during the bending of the display module 100, this can be very useful in protecting the etched display module 100.

In cases where a frame made of a transparent material is used for the protective element 700, the frame of a transparent material can be fabricated to have a particular radius of curvature. Examples of a transparent material can include glass, acrylic, etc. The thickness of the transparent frame can be 0.1~5 T.

As the frame made of a transparent material is transparent, it may not be necessary to perform a separate operation for providing an open region.

The etched display module 100 can be attached to an upper surface or a lower surface of the transparent frame using liquid adhesive or silicone, etc.

Figure 8:
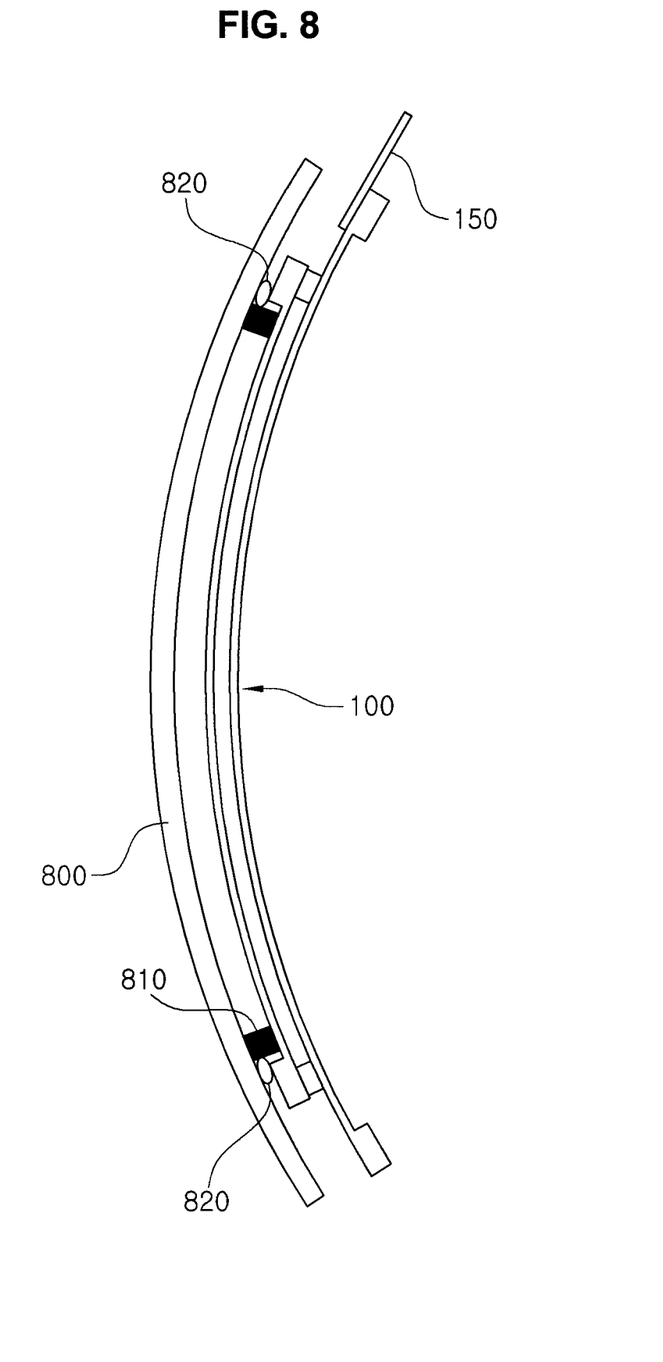
FIG. 8 is a side view of the display module secured to a protective element according to a method of manufacturing a display associated with another embodiment of the present invention.
Figure 9:
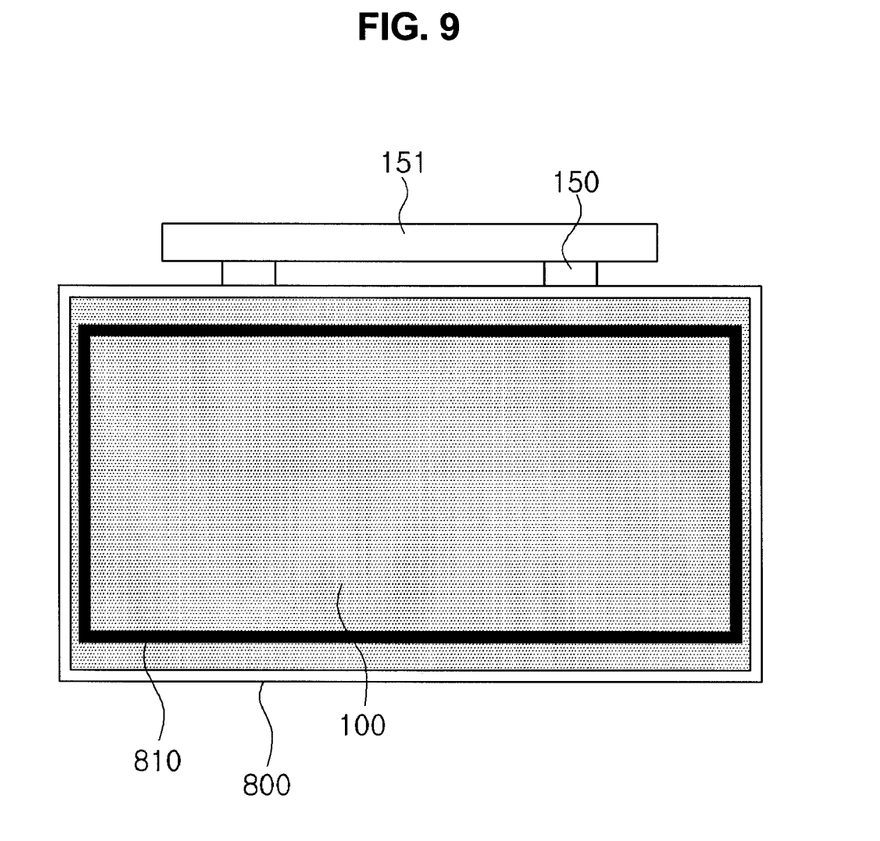
FIG. 9 illustrates the arrangement of FIG. 8 as seen from above.

FIG. 8 is a side view of the display module secured to a protective element according to a method of manufacturing a display associated with another embodiment of the present invention, and FIG. 9 illustrates the arrangement of FIG. 8 as seen from above.

As illustrated in the figures, the display module 100 can be secured to the protective element 800, which may be arranged at an upper surface or a lower surface, by using a double-sided tape 810 having a certain thickness. The protective element 800 can have a particular radius of curvature. The double-sided tape 810 can have two adhesion surfaces. A first adhesion surface of the double-sided tape 810 can be adhered only to an etched surface of the bent display module 100 without being adhered to an unetched surface. Also, a second adhesion surface of the double-sided tape 810 can be adhered to a surface of the protective element 800. The protective element 800 used here can be the same as the protective element 700 described above with reference to FIG. 7.

The thickness of the double-sided tape 810 can be determined such that an empty space may be formed between a vertically downward area below the surface of the protective element 800 and a vertically upward area above the unetched surface of the bent display module 100. However, if the thickness of the double-sided tape 810 is too great, the separation distance of the unetched surface of the bent display module 100 can be too large. This can cause damage to the display module 100. As such, the thickness of the double-sided tape 810 can be determined such that the separation distance between the surface of the protective element 800 and the unetched surface of the display module 100 is not excessively large. For example, the thickness of the tape 810 can be determined such that the separation distance does not exceed the thickness of the substrate 110 or 120 of the display module 100.

In order that a constant distance may be maintained between the protective element 800 and the display module 100, the double-sided tape 810 can be adhered to all four edge areas of the display module 100, as illustrated in FIG. 9.

After the operation of adhering the protective element 800 with the display module 100 using the double-sided tape 810, a sealing operation can be added.

The perimeter portion of the double-sided tape 810 that has secured the display module 100 with the protective element 800 can be sealed by way of a sealant 820. This sealing can reduce the risk of damage to the display module 100.

According to an embodiment of the present invention, at least one of the double-sided tape 810 and the sealant 820 can be made of an optically opaque material. Using an optically opaque material for at least one of the double-sided tape 810 and the sealant 820 in this manner can help avoid the problem of light leakage, which describes undesired light being visible at the front when the backlight and the display module 100 are actually assembled. For example, at least one of the double-sided tape 810 and the sealant 820 can be made to have a black tone color.

As described above, a method of manufacturing a curved display according to an embodiment of the present invention can reduce damage to the etched display module during the manufacture of the curved display using a planar display module.

Also, an embodiment of the present invention can reduce manufacturing unit cost, as the curved display can be manufactured with a single etching process.

Also, an embodiment of the present invention can reduce manufacturing cost, as the curved display can be manufactured using a planar display module without a separate element.

The method of manufacturing a curved display described above is not limited to the compositions and methods of the embodiments set forth above but rather can include combinations of all or parts of different embodiments so that numerous variations of the embodiments may be provided.

The invention claimed is:

1. A method of manufacturing a curved display from a planar display module, the method comprising:
    masking the display module with a masking element such that portions of an upper substrate and a lower substrate of the display module are covered;
    etching the display module such that portions of the masked display module other than the masked portions are decreased in thickness to a predetermined thickness;
    attaching a reinforcement material to at least a portion of an unetched area after the etching, the reinforcement material comprising at least one of liquid adhesive and silicone;
    removing the masking element from the display module after the etching;
    bending the display module into a curved plane; and
    attaching the bent display module to a protective element by using a double-sided tape, the protective element having a particular radius of curvature, the double-sided tape having a particular thickness,
    wherein a first adhesion surface of the double-sided tape is adhered only to an etched surface of the bent display module without being adhered to an unetched surface of the bent display module, and a second adhesion surface of the double-sided tape is adhered to a surface of the protective element,
    wherein the thickness of the double-sided tape is determined such that an empty space is formed between the surface of the protective element and the unetched surface of the bent display module.

2. The method of claim 1, wherein the surface of the protective element and the unetched surface of the bent display module are separated.

3. The method of claim 1, further comprising:
    sealing a perimeter portion of the double-sided tape by using a sealant.

4. The method of claim 3, wherein at least one of the double-sided tape and the sealant comprises an optically opaque material.

5. The method of claim 1, wherein the protective element has a lower brittleness than the etched display module.

6. The method of claim 1, wherein a masking area of the upper substrate is not overlapped with a masking area of the lower substrate in a vertical direction.

* * * * *